H. E. HARRIS.
ANGLE AND LEAD TESTING MACHINE.
APPLICATION FILED DEC. 5, 1917.

1,303,198.

Patented May 6, 1919.
2 SHEETS—SHEET 1.

INVENTOR
Harry E. Harris
BY
A. N. Wooster
ATTORNEY

H. E. HARRIS.
ANGLE AND LEAD TESTING MACHINE.
APPLICATION FILED DEC. 5, 1917.

1,303,198.

Patented May 6, 1919.

INVENTOR
Harry E. Harris
BY
ATTORNEY

UNITED STATES PATENT OFFICE.

HARRY E. HARRIS, OF BRIDGEPORT, CONNECTICUT.

ANGLE AND LEAD TESTING MACHINE.

1,303,198.  Specification of Letters Patent.  Patented May 6, 1919.

Application filed December 5, 1917. Serial No. 205,632.

*To all whom it may concern:*

Be it known that I, HARRY E. HARRIS, a citizen of the United States, residing at Bridgeport, county of Fairfield, State of Connecticut, have invented an Improvement in Angle and Lead Testing Machines, of which the following is a specification.

This invention has for its object to provide an angle and lead testing or measuring machine adapted for general use in measuring the angle and lead of male threads and especially adapted for use in testing thread gages, which shall be rigid and substantial, easy to operate, and so accurate in use that an error of .0001" can be detected by a person with ordinary eyesight, and with the aid of a magnifying glass an error of .00005" can be detected.

It is well understood by manufacturing concerns required to produce accurate work, that the question of screws, taps and tapped holes in work is one of their most difficult problems. In the manufacture of taps, hobs for hobbing dies, male thread gages and hobs for female thread gages, the question of correct lead and correct angle of the thread has been found to be more important even than correct diameter measurements. I am aware that gages of different types have been produced for checking the angle of threads, but I am not aware that any have been produced that could check within .0001" both the angle and the lead of different types of thread.

Figure 1:
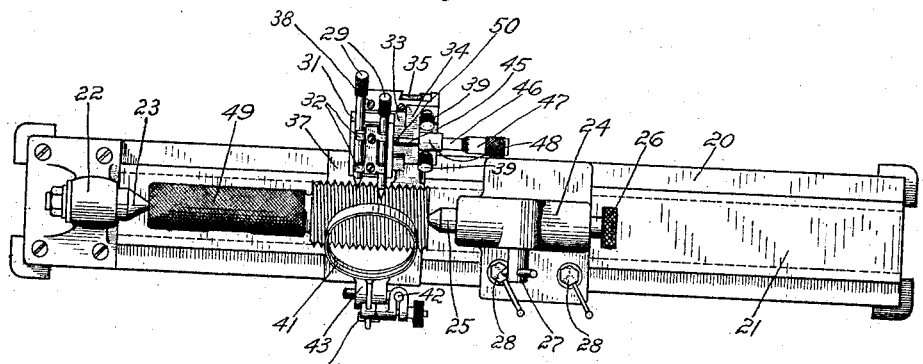
Figure 2:
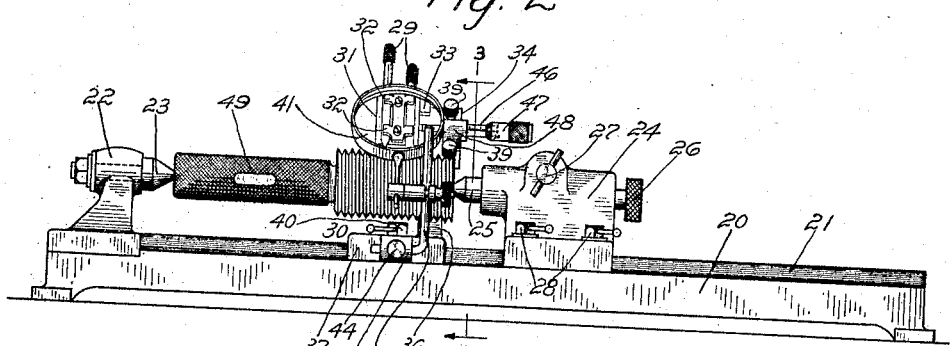
Figure 3:
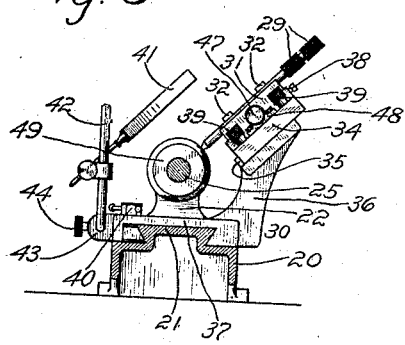
Figure 4:
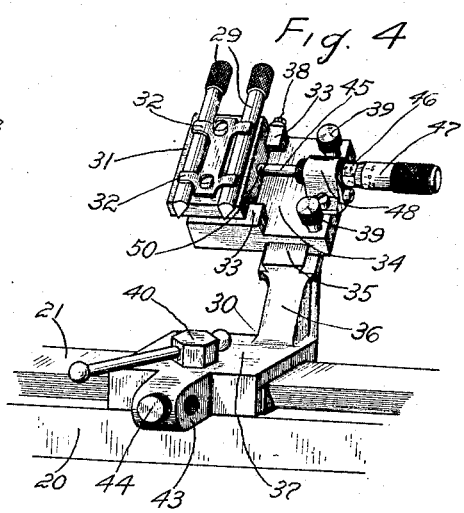
Figure 5:
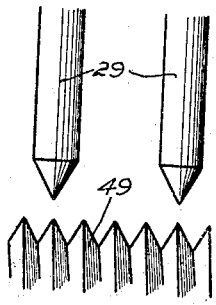
Figure 6:
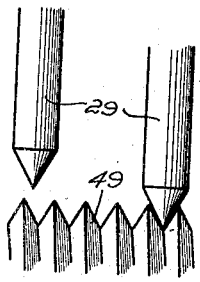

In the accompanying drawing forming a part of this specification,

Figure 1 is a plan view of my novel angle and lead testing machine as in use,

Fig. 2 a side elevation thereof,

Fig. 3 a section on the line 3—3 in Fig. 2, looking in the direction of the arrows, Fig. 4 a detail perspective view, on an enlarged scale, showing the test pieces and the carriage, Figs. 5 to 10, inclusive, are fragmentary elevations on an enlarged scale, illustrating the operation of the test pieces in connection with a thread in detecting errors in the angle and in the lead, and Figs. 11 to 15, inclusive, are views on a still larger scale illustrating the use of a single test piece in detecting errors in the angle of the thread.

20 denotes the bed which is provided with a longitudinal way 21, 22 a stationary head having a fixed center 23 and 24 a tail stock having a center 25 which is in axial alinement with center 23, is preferably spring controlled, and is adapted to be withdrawn by a knob 26. Center 25 is clamped in position after adjustment by a screw 27 and the tail stock is clamped to the bed by screws 28.

The vitally important features of the invention are the test pieces 29 and a carriage therefor which is indicated by 30. The test pieces are rods, which for the standard threads, are provided with cone points. Special test pieces must, of course, be provided for the various types of thread.

The test pieces are carried by a slide block 31 which is provided with grooves to receive them, the centers of the grooves being exactly one inch apart which insures that the points of the test pieces will be exactly one inch apart, it being understood of course that an inch in this country is the common unit of measurement in defining threads. It is essential that the test pieces, the grooves to receive them, and in fact all parts of the carriage be finished with the most perfect accuracy attainable, that the test pieces lie parallel with each other and that the axial lines of the test pieces intersect the axial line of the centers 23 and 25 at right angles. The test pieces are slidably retained in the grooves by spring clamps 32, the heads of the test pieces being shown as knurled for convenience in manipulation. The slide block is adapted to be moved longitudinally to the bed on ways 33, on a slide 34, which is itself adapted to be moved in a plane at right angles to the path of movement of the slide block, *i. e.* transversely to the bed, on a way 35, on a standard 36 extending upward from the base 37 of the carriage which is adapted to be moved on way 21. The slide block is frictionally retained in any position in which it is placed by screws 38, one only appearing in the drawing. The slide is clamped upon the ways on the standard by screws 39 and the base is clamped upon the way on the bed by a screw 40. 41 denotes a magnifying glass which is universally adjustable on a standard 42 having an angle arm engaging a hole in a lug 43 extending from the base of the carriage in which the angle arm is locked by a screw 44.

45 denotes the spindle, 46 the hub and 47 the sleeve of a micrometer head, the hub being rigidly held in a bracket 48 secured to slide 34, and the spindle coöperating with a hardened stud or anvil 50 set into the side face of slide block 31. 49 denotes the work, in the present instance a plug thread gage.

The operation is as follows:—The work is first set on the centers and then the carriage is brought to position and locked there by screw 40. The glass is then adjusted in position and the standard locked by screw 44. Slide 34 is then set in proper relation to the diameter of the work and locked by screws 39. Next, one of the test pieces is brought into engagement with the thread of the work, the work being rotated by hand until the point of the test piece fits the thread accurately, that is so that no light shows between the walls of the thread and the test piece on either side. Suppose now, that it is desired to test the lead, see Figs. 5 to 10, inclusive. One of the test pieces having been placed in engagement with the thread, as in Figs. 6, 7 and 8, the micrometer spindle is moved into close engagement with the anvil, set in the side face of the slide block, and the reading of the micrometer noted. The other test piece may then be brought into engagement with the thread. If the lead is accurate, the second test piece will engage the thread just as accurately as the first, as indicated by dotted lines in Fig. 7. Let us assume, however, that the lead is too short, as in Figs. 5, 6 and 7. This will be demonstrated when the second test piece is brought into engagement with the thread, as shown in full lines at the left in Fig. 7.

Figure 7:
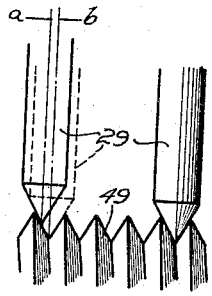

In order to determine the amount of error in the lead, the first test piece (the right hand one in the present instance) would be withdrawn from the thread and the micrometer spindle withdrawn from its engagement with the anvil, and then slide block 31 would be moved toward the right into position to permit the left hand test piece to be placed in engagement with the thread, as shown in dotted lines in Fig. 7. The micrometer spindle may then be turned again into close engagement with the anvil and a second reading taken. The difference between the two readings will show the error, in the present instance a minus error, as indicated by the space between the lines $a$—$b$ in Fig. 7.

Figure 8:
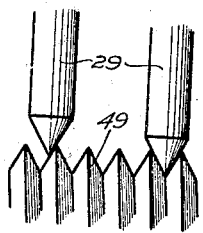
Figure 9:
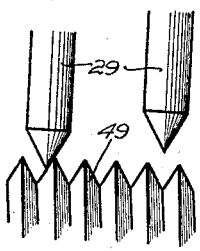
Figure 10:
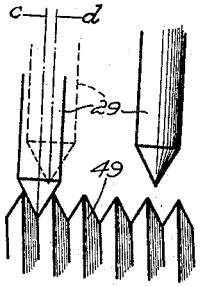

Figs. 8, 9 and 10, indicate a plus error in the lead. The operation is the same as before except that the micrometer spindle does not have to be withdrawn. The left hand test piece is placed in engagement with the thread as before, and then the micrometer spindle is turned into close engagement with the anvil as before, and a second reading taken. The difference between the two readings will show the error, in the present instance a plus error, as indicated by the space between the lines $c$—$d$ in Fig. 10.

Figure 11:
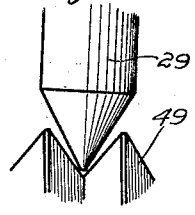
Figure 12:
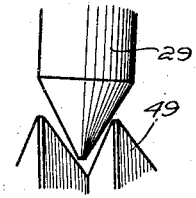
Figure 13:
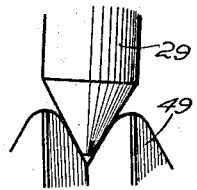
Figure 14:
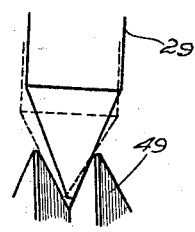
Figure 15:
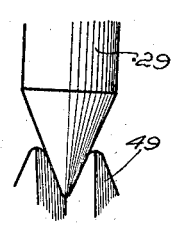

Figs. 11 to 15, inclusive, illustrate the use of my novel machine in testing the angle of threads. One test piece only is ordinarily used. Fig. 11 shows a condition in which the test piece proves that the angle of the thread is too great. In Fig. 12, the test piece proves that the angle of the thread is distorted. In Fig. 13, the test piece proves an inaccuracy in the tops of the threads which are rounded over too much. In Fig. 14, another distortion of the thread is shown, also the use of test pieces having different included angles, the test piece shown in full lines checking the angle upon one side of the thread and the test piece shown in dotted lines checking the angle upon the other side of the thread. In Fig. 15, the engagement of the test piece with the thread proves that the angle of the thread is practically perfect. In this condition, no light whatever would show between the test piece and the walls of the thread on either side.

Having thus described my invention, I claim:—

1. A machine of the character described, comprising a carriage, a slide movable thereon transversely thereto, a slide block movable on and transversely to the slide, and spaced apart test pieces carried by the slide block.

2. A machine of the character described, comprising a carriage, a slide movable thereon transversely thereto, a slide block movable on and transversely to the slide and having spaced apart grooves, test pieces lying in said grooves and resilient means for retaining the test pieces in place.

3. A machine of the character described, comprising work carrying centers, a carriage, a slide movable thereon transversely to the carriage, a slide block movable on and transversely to the slide, and test pieces carried by the slide block, the test pieces lying parallel and the axial lines of the test pieces intersecting the axial line of the centers at right angles.

4. A machine of the character described, comprising a carriage, a slide movable thereon transversely thereto, a slide block movable on and transversely to the slide and provided with an anvil, spaced apart test pieces carried by the slide block and adapted to engage a thread, and a micrometer head adapted to coöperate with the anvil in reading positions of the test pieces.

5. A machine of the character described, comprising a carriage, a slide movable thereon transversely thereto, a slide block movable on and transversely to the slide, spaced apart test pieces carried by the slide block and adapted to engage a thread, and means coöperating with the slide block for reading positions of the test pieces when in engagement with a thread.

6. In a machine of the character described, the combination of a bed having a longitudinal way and a head provided with a fixed center, a tail stock adapted to slide on the way and having a movable center, a carriage adapted to slide on the way, a slide movable transversely on the carriage, a slide block movable on and transversely on the slide, and spaced apart test pieces carried by the slide block and adapted to engage the thread of work carried by the centers.

7. In a machine of the character described, the combination of a bed having fixed and movable centers, a carriage adapted to be moved longitudinally on the bed, a slide movable on and transversely on the carriage, a slide block movable transversely on the slide, and an adjustable test piece carried by the slide block.

8. The method of measuring errors in the lead of threads, which consists in placing a test piece closely in engagement with the walls of a thread, taking a micrometer reading of the position of the test piece, placing a second test piece spaced from the first a distance which is a multiple of the intended pitch of the thread, closely in engagement with the walls of the thread, and then taking a micrometer reading of the position of the second test piece, the difference in the two micrometer readings indicating any error, plus or minus, in the lead of the thread.

In testimony whereof I affix my signature.

HARRY E. HARRIS.

Copies of this patent may be obtained for five cents each, by addressing the "Commissioner of Patents, Washington, D. C."